United States Patent
Hartley (10) Patent No.: US 9,737,919 B2
(45) Date of Patent: Aug. 22, 2017

(54) PORTABLE WET DRILLING WASTE TREATMENT

(71) Applicant: Soil-Bond, Inc., Bay City, MI (US)

(72) Inventor: Dwight Hartley, Bay City, MI (US)

( * ) Notice: Subject to any disclaimer, the term of this patent is extended or adjusted under 35 U.S.C. 154(b) by 0 days.

(21) Appl. No.: 15/174,785

(22) Filed: Jun. 6, 2016

(65) Prior Publication Data
US 2017/0014877 A1 Jan. 19, 2017

Related U.S. Application Data (60) Division of application No. 14/695,575, filed on Apr. 24, 2015, now abandoned, which is a continuation of
(Continued)

(51) Int. Cl.
 *E21B 21/06* (2006.01)
 *B09B 3/00* (2006.01)
(Continued)

(52) U.S. Cl.
 CPC .............. *B09B 3/0025* (2013.01); *A62D 3/33* (2013.01); *B01D 19/0052* (2013.01); *B04C 9/00* (2013.01); *B65G 15/00* (2013.01); *B65G 33/14* (2013.01); *B65G 33/26* (2013.01); *B65G 41/002* (2013.01); *B65G 41/007* (2013.01); *B65G 53/24* (2013.01); *B65G 53/60* (2013.01); *C02F 1/38* (2013.01); *E21B 21/066* (2013.01); *E21B 21/067* (2013.01); *E21B 41/005* (2013.01);
(Continued)

(58) Field of Classification Search
 CPC ..................................................... E21B 21/066
 See application file for complete search history.

(56) References Cited

U.S. PATENT DOCUMENTS 4,041,623 A  8/1977  Miller et al.
4,207,647 A  6/1980  Masters
(Continued)

OTHER PUBLICATIONS

"Wholesale Supply for the West Coast ." DMI Cement—PortlandCement—TypeI/II  Cement—TypeVCement—WhiteCement—PVCement—Mortar Cement. Oct. 19, 2012. <http://www.dmicement.com/>.
(Continued)

*Primary Examiner* — Giovanna C Wright
(74) *Attorney, Agent, or Firm* — Maschoff Brennan (57) ABSTRACT

Portable wet drilling waste treatment. In one example embodiment, a method for portable wet drilling waste treatment may include transporting a transportable frame, maneuvering an open end of a waste conduit, vacuuming air and the wet drilling waste, using a motor-driven vacuum, into the open end of the waste conduit, through the waste conduit, and into a cyclonic separator, separating the wet drilling waste from the air using the cyclonic separator, using a waste auger to transport the wet drilling waste, using a treatment material auger to transport a treatment material, operating the waste auger and the treatment material auger at coordinated rates to transport an effective ratio of the wet drilling waste to the treatment material, using a mixing auger to simultaneously transport the wet drilling waste and the treatment material, and operating the mixing auger at an effective rate resulting in a solidified treated material.

19 Claims, 7 Drawing Sheets

Related U.S. Application Data application No. 13/110,767, filed on May 18, 2011, now abandoned.

(51) Int. Cl.

| | | |
|---|---|---|
| *C02F 1/38* | (2006.01) | |
| *B01D 19/00* | (2006.01) | |
| *A62D 3/33* | (2007.01) | |
| *B04C 9/00* | (2006.01) | |
| *B65G 15/00* | (2006.01) | |
| *B65G 33/14* | (2006.01) | |
| *B65G 33/26* | (2006.01) | |
| *B65G 41/00* | (2006.01) | |
| *B65G 53/24* | (2006.01) | |
| *B65G 53/60* | (2006.01) | |
| *E21B 41/00* | (2006.01) | |
| *A62D 101/20* | (2007.01) | |
| *A62D 101/43* | (2007.01) | |

(52) U.S. Cl.
CPC ...... *A62D 2101/20* (2013.01); *A62D 2101/43* (2013.01); *A62D 2203/10* (2013.01); *B65G 2201/045* (2013.01); *C02F 2201/008* (2013.01); *C02F 2301/063* (2013.01)

(56) References Cited

U.S. PATENT DOCUMENTS

| | | | |
|---|---|---|---|
| 4,227,997 | A | 10/1980 | Shaddock |
| 4,423,987 | A | 1/1984 | Powers |
| 4,695,388 | A | 9/1987 | Long, Jr. |
| RE33,747 | E | 11/1991 | Hartley et al. |
| 5,127,765 | A | 7/1992 | Millgard |
| 5,284,578 | A | 2/1994 | Tobler |
| 5,395,286 | A | 3/1995 | Sgariboldi |
| 5,554,279 | A | 9/1996 | Christy |
| 5,904,855 | A | 5/1999 | Manz |
| 6,202,330 | B1 | 3/2001 | Bolton |
| 6,790,349 | B1 | 9/2004 | Sawyer |
| 6,863,826 | B2 | 3/2005 | Sheets |
| 9,139,969 | B2 | 9/2015 | Hartley |
| 2010/0196129 | A1 | 8/2010 | Buckner |
| 2012/0292257 | A1* | 11/2012 | Hartley ............... C02F 1/38 210/709 |
| 2013/0112598 | A1* | 5/2013 | Culver ............... B03B 7/00 209/10 |
| 2015/0251108 | A1 | 9/2015 | Hartley |
| 2015/0321594 | A1 | 11/2015 | Harms, Jr. et al. |

OTHER PUBLICATIONS

"Toll Blending & Manufacturing." DMI Cement—Toll Blending—Cement Blanding. Oct. 19, 2012. <http://www.dmicement.com/blending.html>.
"Mineral By-Product Evaluation ." DMI, Diverfied Minerals, Inc.—Product Evaluation. Oct. 19, 2012. <http://soli-bond.com/services/evaluation.html>.
"Packaging & Warehouse." DMI—Packaging & Warehouse—DMI Cement—Super Sack Cement. Oct. 19, 2012. <http://www.dmicement.com/packaging.html>.
"Zorbix ." DMI—Zorbix—HighAbsorptionStabilizer andSolidifier. Oct. 19, 2012. <http://www.dmicement.com/zorbix.html>.
"Fly Ash ." DMI, DiversifiedMinerals, Inc. —FlyAshCement. Oct. 19, 2012. <http://www.dmicement.com/fly_ash_cement.html>.
"CKD." DMI—CKD, CementKilnDust—Acost efficient alternativetoother pozlanic materials. Oct. 19, 2012. <http://www.dmicement.com/ckd.html>.
"Environmental Technology" Dec. 2006—Closed—loop drilling system: A viable alternative to reserve waste pits. Sep. 11, 2012. <http://www.worldoil.com/December-2006-Closed-loop-drilling-system-A-viable-alternative-to-reserve-waste-pits.html>.
United States Patent and Trademark Office, Office Action, Mar. 27, 2014, 22 pages in US. Appl. No. 13/110,767.
United States Patent and Trademark Office, Final Office Action, Oct. 24, 2014, 27 pages in U.S. Appl. No. 13/110,767.
United States Patent and Trademark Office, Office Action, Nov. 3, 2015, 32 pages in US. Appl. No. 14/695,575.
United States Patent and Trademark Office, Final Office Action, Mar. 9, 2016, 32 pages in U.S. Appl. No. 14/695,575.
United States Patent and Trademark Office, Office Action, Sep. 5, 2014, 9 pages in U.S. Appl. No. 13/444,433.
Academic Press Dictionary of Science and Technology, Oxford: Elsevier Science & Technology, Auger Packer, Credo Reference, Web, Mar. 19, 2014, 2 pages.
Caterpillar, Diesel Truck Engine, 3126B, 175-330 hp, Engine Specifications, 1999, 6 pages.
"About Us" http://www.soli-bond.com/aboutus.shtml. Archived Jun. 1, 2008. Retrieved @ http://web.archive.org/web/20080601210710/http://www.soli-bond.com/aboutus.shtml. Last accessed Sep. 17, 2014.
"Home" http://www.soli-bond.com/index.shtml. Archived Jun. 1, 2008. Retrieved @ http://web.archive.org/web/20080601210727/http://www.soli-bond.com/index.shtml. Last accessed Sep. 17, 2014.
"Soil Remediation" http://www.soli-bond.com/medation.shtml. Archived Jun. 1, 2008. Retrieved @ http://web.archive.org/web/20080601211001/http://www.soli-bond.com/soilremedation.shtml. Last accessed Sep. 17, 2014.
"Oil Field Processing" http://www.soli-bond.com/oilfield.shtml. Archived Jun. 1, 2008. Retrieved @ http://web.archive.org/web/20080601210741/http://www.soli-bond.com/oilfield.shtml. Last accessed Sep. 17, 2014.
"PV Cement ." DMI—PVCement—Environmental Cement. MoreAggressiveTowardLeadandZinc stabilizationfor WasteTreatment. Oct. 19, 2012. <http://www.dmicement.com/pv_cement.html>.
"DMI, Diversified Minerals, Inc. ." DMI Cement—Super SackCement—FlyAsh—KilnDust—Slag Cement—PVCement-Bentonite—Lime—BlendedCement. Oct. 19, 2012. <http://www.dmicement.com/>.
"Pitless Operations ." Services—Soli-Bond Waste Processing Services. Sep. 17, 2012. <http://soli-bond.com/services/pitless.html>.
Dual Cyclone Autoloader. GapVax. Available as of Dec. 17, 2010.
HV-56 ComboVac. GapVax 2011. Retrived Nov. 28, 2011. www.gapvax.com/56combo.html.
HV-57 Hi-Dump. GapVax 2011 Retrived Nov. 28, 2011. www.gapvax.com/hidumb.html.
Industrial Vacuum Cleaner Systems. Vector 2011. Retrieved Nov. 28, 2011. www.vector-vacuums.com/industrial-vacuum-cleaner-systems-c-1.html.
Processer Photo (A); Processer for treating waste. (1999).
Soli-Bond Waste Management Services Brochure. (2001).
SV-50 Skid Mounted Vacuum Unit. GapVax. Available as of Dec. 17, 2010.
Vacuum Truck Photo (B); Vacuum truck dumping waste into truck. (1999).
United States Department of the Interior, Bureau of Land Management, letter and attached exhibits dated Nov. 15, 2011, regarding Management of Oil and Gas Exploration and Production Pits.
Resources Agency of California Department of Conservation Division of Oil, Gas, and Geothermal Resources, Well Summary Report of Well "Racetrack" 10-1, dated Feb. 13, 2007.
Resources Agency of California Department of Conservation Division of Oil, Gas, and Geothermal Resources, History of Oil or Gas Well of Well "Racetrack" 10-1, dated Feb. 13, 2007.
Resources Agency of California Department of Conservation Division of Oil, Gas, and Geothermal Resources, Well Summary Report of Well "Racetrack" 2-5B, dated Dec. 1, 2008.
Resources Agency of California Department of Conservation Division of Oil, Gas, and Geothermal Resources, History of Oil or Gas Well of Well "Racetrack" 2-5B, dated Dec. 1, 2008.

(56) References Cited

OTHER PUBLICATIONS

Naftex Operating Company, Proposed Drilling Program of Well "Racetrack" 2-5B, dated May 27, 2008.
Department of Conservation Division of Oil, Gas & Geothermal Resources, Permit to Conduct Well Operations of Well "Racetrack" 2-4B, dated Jun. 9, 2008.
Naftex Operating Company, Proposed Drilling Program of Well "Racetrack" 2-4B, dated May 27, 2008.
Resources Agency of California Department of Conservation Division of Oil, Gas, and Geothermal Resources, Well Summary Report of Well "Racetrack" 3-10B, dated May 18, 2007.
Resources Agency of California Department of Conservation Division of Oil, Gas, and Geothermal Resources, History of Oil or Gas Well of Well "Racetrack" 3-10B, dated May 18, 2007.
Naftex Operating Company, Proposed Drilling Program of Well "Racetrack" 3-10B, dated Sep. 18, 2006.
Resources Agency of California Department of Conservation Division of Oil, Gas, and Geothermal Resources, Well Summary Report of Well "Racetrack" 3-0, dated Jan. 26, 2009.
Resources Agency of California Department of Conservation Division of Oil, Gas, and Geothermal Resources, History of Oil or Gas Well of Well "Racetrack" 3-0, dated Jan. 26, 2009.
Department of Conservation Division of Oil, Gas & Geothermal Resources, Permit to Conduct Well Operations of Well "Racetrack" 3-0, dated May 21, 2008.
Naftex Operating Company, Proposed Drilling Program of Well "Racetrack" 3-0, dated May 5, 2008.
Resources Agency of California Department of Conservation Division of Oil, Gas, and Geothermal Resources, Well Summary Report of Well "Racetrack" 1-1B, dated Nov. 17, 2008.
Resources Agency of California Department of Conservation Division of Oil, Gas, and Geothermal Resources, History of Oil or Gas Well of Well "Racetrack" 1-1B, dated Nov. 11, 2008.
Department of Conservation Division of Oil, Gas & Geothermal Resources, Permit to Conduct Well Operations of Well "Racetrack" 1-1B, dated Jun. 9, 2008.
Naftex Operating Company, Proposed Drilling Program of Well "Racetrack" 1-1B, dated May 28, 2008.
Resources Agency of California Department of Conservation Division of Oil, Gas, and Geothermal Resources, Well Summary Report of Well "Racetrack" 1-2B, dated Dec. 1, 2008.
Resources Agency of California Department of Conservation Division of Oil, Gas, and Geothermal Resources, History of Oil or Gas Well of Well "Racetrack" 1-2B, dated Dec. 1, 2008.
Department of Conservation Division of Oil, Gas & Geothermal Resources, Permit to Conduct Well Operations of Well "Racetrack" 1-2B, dated Jun. 9, 2008.
Naftex Operating Company, Proposed Drilling Program of Well "Racetrack" 1-2B, dated May 27, 2008.
Resources Agency of California Department of Conservation Division of Oil, Gas, and Geothermal Resources, Well Summary Report of Well "Racetrack" 3-4B, dated Dec. 9, 2008.
Department of Conservation Division of Oil, Gas & Geothermal Resources, Permit to Conduct Well Operations of Well "Racetrack" 3-4B, dated Jun. 9, 2008.
Naftex Operating Company, Proposed Drilling Program of Well "Racetrack" 3-4B, dated May 28, 2008.
Resources Agency of California Department of Conservation Division of Oil, Gas, and Geothermal Resources, Well Summary Report of Well "Racetrack" 1-5B, dated Dec. 9, 2008.
Resources Agency of California Department of Conservation Division of Oil, Gas, and Geothermal Resources, History of Oil or Gas Well of Well "Racetrack" 1-5B, dated Dec. 9, 2008.
Department of Conservation Division of Oil, Gas & Geothermal Resources, Permit to Conduct Well Operations of Well "Racetrack" 1-5B, dated Jun. 9, 2008.
Robinson, L, "Historical Perspective and Introduction", Drilling Fluids Processing Handbook, p. 1, Chapter 1, 2005 Gulf Professional Publishing / Elsevier Inc., Burlington, MA.
Piper, W. et al., "Waste Management", Drilling Fluids Processing Handbook, p. 367, 372-399 & 403-406, Chapter 16, 2005 Gulf Professional Publishing / Elsevier Inc., Burlington, MA.
Adaska, W.S. et al., "Beneficial Uses of Cement Kiln Dust" IEEE/PCA 50th Cement Industry Technical Conference, May 19-22, 2008, p. 1-19, Miami, Florida.
Enterprise Drilling Fluids, Inc. Letter dated Mar. 6, 2005, regarding "Orchard Petroleum; South Belridge Drilling Program".
Hinds, A.A. et al., "Treatment Reclamation and Disposal Options for Drilling Muds and Cuttings", SPE/IADC Drilling conference, Feb. 9-12, 1986, p. 617-621, Tables 1-9 and Figures 1-3, Dallas, Texas.
AquaTerra Technologies, "Treatment of Oil Field Waste", Stabilization Solidification vol. 1, Issue 1, (2003), p. 1-3.

* cited by examiner

PORTABLE WET DRILLING WASTE TREATMENT

BACKGROUND

I. The Field of the Invention

The present invention relates generally to methods and devices for portable wet drilling waste treatment.

II. Background and Relevant Art

In drilling operations, a fluid commonly referred to as "mud" is circulated from the surface, downward through a drill pipe and out openings in the drill bit at the bottom of a borehole. The mud may include hydrocarbons, lubricants and other chemicals that assist in the drilling process. After exiting the drill bit at the bottom of the borehole, the mud along with other material from the borehole (often referred to collectively as "cuttings"), are pushed back upward through the borehole to the surface.

Once at the surface, the cuttings that are extracted from the borehole may be processed in order to separate the mud from the other material. The mud may then be recycled and sent back down the drill pipe, and the material that is separated from the mud may be collected into a separate area. Depending on the depth of the borehole and the location of the drill site, the material that is separated from the mud, which is commonly referred to as "sludge," may include a mixture of different solids, such as stone, dirt, clay, and salt. Sludge may also include toxic materials like hydrocarbons, heavy metals, and naturally occurring radioactive material. Despite the separating process, it is also common for sludge to include nonsolid components, such as water, oil, mud, and other fluids. Sludge can be very difficult to handle with conventional equipment.

Untreated sludge should not be introduced directly back into the environment for a variety of reasons. For example, if the discarded sludge contains salt, plant life at or around an area where sludge is dumped may die. Further, if the sludge contains hydrocarbons, heavy metals or other toxic materials, these materials may leach into the ground and contaminate ground water. Many states have regulations that make it illegal to dump untreated sludge from a drill site into the environment.

Sludge from a drill site can be treated at the drill site. Conventional techniques for treating sludge near a drill site include digging a large pit into the ground near the drill site. The bottom and side walls of the pit may be lined with a thick plastic liner to prevent environmental contamination from the sludge. The sludge may then be deposited into the pit. A chemical that treats the sludge may then be added to the sludge pit and mixed into the sludge. Due to the size of the pits, trackhoe excavators are often used to mix the chemical into the sludge. The chemical mixed into the pool of sludge may convert the mixture into a solid, thereby rendering inert any potentially hazardous materials within the sludge.

This method for treating sludge is problematic for a number of different reasons. First, the space around a drill site is often limited. Depending on the depth and size of a borehole, there may not be sufficient space available in the immediate vicinity of a drill site to dig a pit large enough to deposit and treat sludge. Second, there is a significant potential for environmental contamination. It is not uncommon for a trackhoe operator to tear the plastic lining within a pit during the mixing process. If the plastic lining within the pit is torn, there is no barrier to keep the sludge from seeping into the ground. Third, mixing the chemical thoroughly into the sludge can be difficult. If not mixed thoroughly, some of the sludge may not be treated and may remain potentially hazardous to the environment. Further, if the sludge is not mixed completely or if an insufficient amount of or ineffective chemical is used to treat the sludge, the treated mixture may not solidify properly. There is a potential that a vehicle traveling over or a person walking across such a sludge pit may sink into the pit.

Finally, a pit containing untreated sludge can be a danger to birds and other animals that land on or wander into it. As untreated sludge sits in a pit, the solids may separate from the fluids. The solids settle to the bottom of the pit and the fluid collects at the surface. This fluid is often oily, containing hydrocarbons. Any bird or other animal that comes into contact with this fluid is likely to be harmed. Recognizing the significance of this problem, federal regulations exist that impose a fine on operators of drill sites for each animal that dies in a sludge pit.

Alternatively, sludge may be treated off-site. To treat sludge at an off-site location, the sludge may be collected into transportable containers. Often these containers are then taken by truck to a facility where the sludge is treated. Once treated, the sludge may be used as fill material back at the drill site or it can be discarded at a landfill.

As with on-site treatment of sludge, transporting sludge to an off-site facility for treatment is problematic for a number of different reasons. First, there is a significant potential for environmental contamination. Sludge can be spilled while being transferred from the drill site to the transportable container. In addition, there is a potential that the sludge can leak from the container while in transit to the treatment facility. Second, transporting sludge to an off-site facility requires significant resources, including fuel, time, and manpower. Sludge must be loaded into a container and unloaded at a treatment facility. Once treated, the material must be reloaded back onto a truck to either be returned to the drill site or taken to a landfill. Because of these dangers, there are federal regulations that limit the weight, volume, and physical condition of sludge that can be transported in one load by a single truck. There are also federal regulations that limit the amount of time that a licensed driver can drive in a single day. Compliance with these regulations often makes the transportation of sludge even more expensive. Finally, because the space around a drill site is limited, it can be difficult to get trucks into and away from the drill site. As the distance between the drill site and the trucks increases, the potential for a spill between the drill site and the truck also increases.

The aforementioned problems relating to sludge that are encountered in the drilling industry are also encountered in a number of other industries. Indeed, waste material (including sludge) is a common byproduct that exists in many different industries. As in drilling operations, waste material in other industries is often in need of treatment before it can be discarded. Large vacuum trucks are often used to collect waste material. Because vacuum trucks are not generally equipped to treat the waste material, once the vacuum truck is full, the truck must transport the waste material to a specialized facility for treatment. The waste material may be removed from the vacuum truck and treated by the facility. Once the waste material has been treated, it may be loaded into another truck or trailer for final disposal. As explained previously, this method for collecting and treating waste materials is problematic.

SUMMARY

In one example embodiment, a method for portable wet drilling waste treatment may include transporting a transportable frame from a first geographic location to a drilling site at a second geographic location that is distant from the first geographic location, maneuvering an open end of a waste conduit that extends from the transportable frame around the drilling site to multiple positions of wet drilling waste that was produced at the drilling site, vacuuming air and the wet drilling waste, using a motor-driven vacuum that is positioned on the transportable frame, from the multiple positions of the wet drilling waste into the open end of the waste conduit, through the waste conduit, and into a cyclonic separator that is positioned on the transportable frame, separating the wet drilling waste from the air using the cyclonic separator, using a waste auger that is positioned on the transportable frame to transport the wet drilling waste from the cyclonic separator, using a treatment material auger that is positioned on the transportable frame to transport a treatment material, operating the waste auger and the treatment material auger at coordinated rates to transport an effective ratio of the wet drilling waste to the treatment material, using a mixing auger that is positioned on the transportable frame to simultaneously transport the wet drilling waste and the treatment material from the waste auger and the treatment material auger, respectively, and operating the mixing auger at an effective rate to mix the treatment material with the wet drilling waste to yield a solidified treated material.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

I. Introduction and Definitions

Implementations of the present invention solve one or more of the problems in the art with an apparatus for collecting and treating waste materials. In particular, one implementation of the present invention includes a mobile and integrated apparatus for continuously collecting and treating a waste material with a portable unit that can be stationed at a waste production site. The present invention also provides methods for collecting and treating waste material with a portable apparatus that continuously collects and treats a waste material.

Waste material, as that term is used herein, can include any material that requires some form of treatment before it can be disposed of at a landfill, used as a construction fill material, or otherwise discarded. A waste material can include a variety of materials in various forms. For example, a waste material can be wet or dry. A waste material may be a liquid, a solid, a slurry, or a gelatinous substance. A waste material may or may not be toxic or include elements that are harmful to the environment. By way of example only, waste materials can include, but are not limited to, sludge from a drilling site, sewage, mud, dirt, dust, ash, and any type of sediment from a pit, pond, lagoon, tank bottom, or other enclosure.

A waste material can be treated by mixing it with a treating material. The way in which a treating material treats a waste material can vary. For example, a treating material can simply solidify a waste material that is too wet to be discarded at a landfill. A treating material can also bind or render inert any toxic elements in a waste material, such as hydrocarbons or heavy metals. As with the waste material, a treating material can include a variety of materials in various forms. A treating material can be wet or dry. By way of example only, treating materials can include, but are not limited to, saw dust, wood chips, cement kiln dust, lime kiln dust, ash, sulphuric acid, portland cement slurry, bentonite clay slurry, peat moss or other growing media, absorbent polymers, or any hydroscopic or cementitious material.

A waste material can be collected from a number of different sites that produce a waste material. These waste production sites include but are not limited to drilling sites, manufacturing plants, mines, paint and other chemical factories, refineries, and power plants. The waste material from these sites can be delivered to a mobile collecting and treating apparatus as described in the present invention in a number of different ways.

Figure 1:
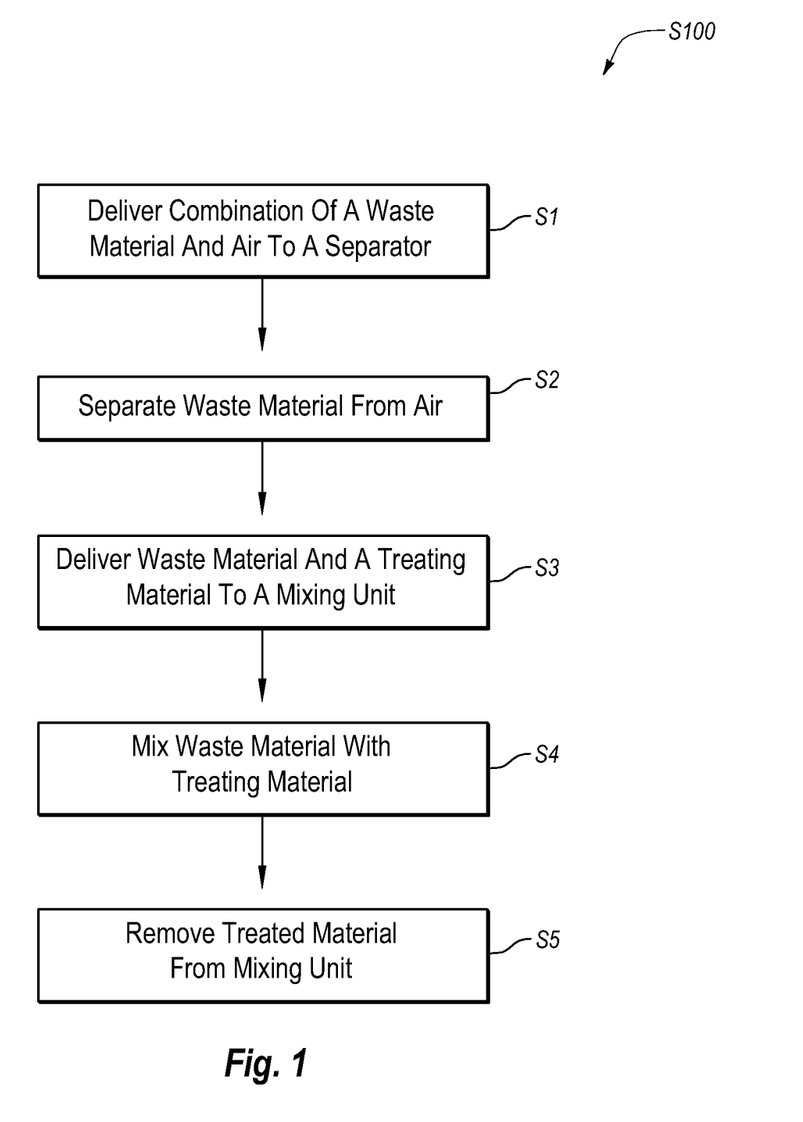
FIG. 1 illustrates a flow diagram identifying steps that may be involved in a first method for collecting and treating a waste material according to the present invention.

FIG. 1 illustrates a flow diagram identifying steps of a first method that can be implemented in a method for collecting and treating a waste material. In a first step S1 of first method S100, a combination of a waste material and air is delivered to a separator. The waste material can be delivered to the separator through a pipe, conduit, or conveyor system. The waste material can also be delivered to the separator in batches or continuously. For example, a conduit attached at one end to a vacuum source can be used to continuously deliver waste material and air to a separator.

In a second step S2, the waste material is separated from the air. One of ordinary skill in the art will recognize that there are a variety of different devices and methods that can be employed to separate a waste material from air. For example, a separator may use cyclonic separation or a filter or another device or method for separating a waste material from air.

In a third step S3, the waste material and a treating material are delivered to a mixing unit. The waste material and treating material can be delivered to the mixing unit in batches or continuously. For example, a metering auger can be used to continuously deliver a waste material to a mixing unit at a desired rate. A metering auger can also be used to continuously deliver a treating material to a mixing unit at a desired rate.

In a fourth step S4, the waste material is mixed with the treating material. In one embodiment, a mixing auger can be used to mix the waste material with the treating material. In a final step S5, the treated material is removed from the mixing unit. The treated material can be removed in batches or continuously.

Each of the steps associated with first method S100 may advantageously be performed on a mobile, portable and integrated apparatus for collecting and treating a waste material (e.g., a trailer, a barge, a railroad car, etc.). Further, these steps can be performed in a closed system, which can assist in avoiding spills and leaks.

Figure 2:
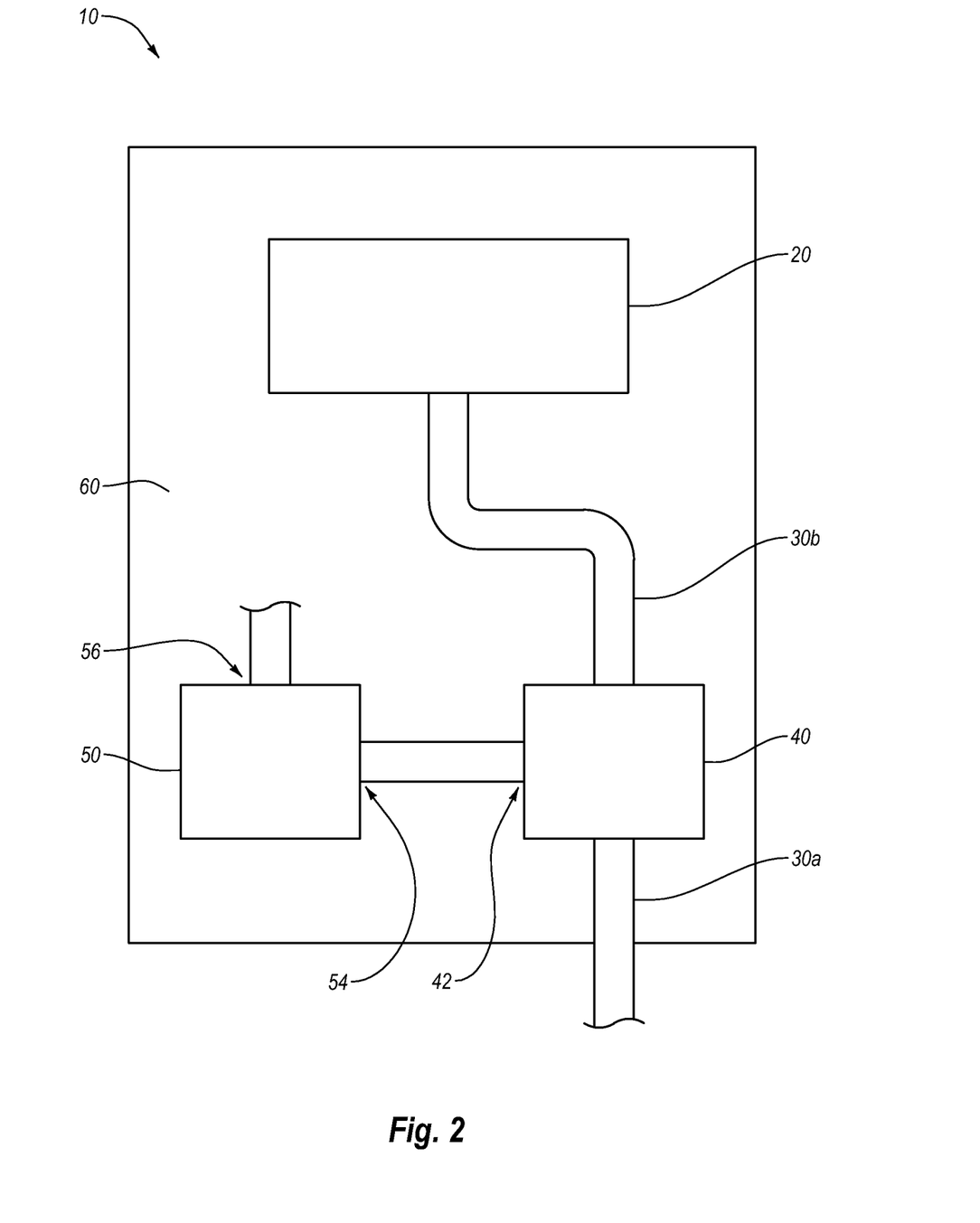
FIG. 2 illustrates a block diagram of a first exemplary apparatus according to the present invention.

FIG. 2 illustrates a block diagram of an apparatus according to the present invention, which can implement the steps of first method S100. Apparatus 10 includes a delivery mechanism, which can be any mechanism that delivers a waste material to a mixing unit. The delivery mechanism in apparatus 10 comprises a motor driven blower 20 and a separator 40. Blower 20 creates an area of low pressure within conduit portions 30a and 30b. Conduit portion 30a delivers a waste material and air to the separator 40. Conduit portion 30b delivers air and a residual amount of waste material to blower 20. Preferably, conduit portion 30b includes one or more additional separators in order to reduce the amount of residual waste to blower 20. However, additional separators are not necessary. Separator 40 is in fluid communication with a mixing unit 50. Separator 40 delivers the waste material to the mixing unit 50 through an outlet 42. Mixing unit 50 receives the waste material through an inlet 54. Mixing unit 50 can be powered by a motor (not shown). Mixing unit 50 mixes the waste material with a treating material. Once mixed, the treated material can exit mixing unit 50 through an outlet 56. Each of the devices associated with apparatus 10 can be advantageously positioned on a portable unit 60.

Figure 3:
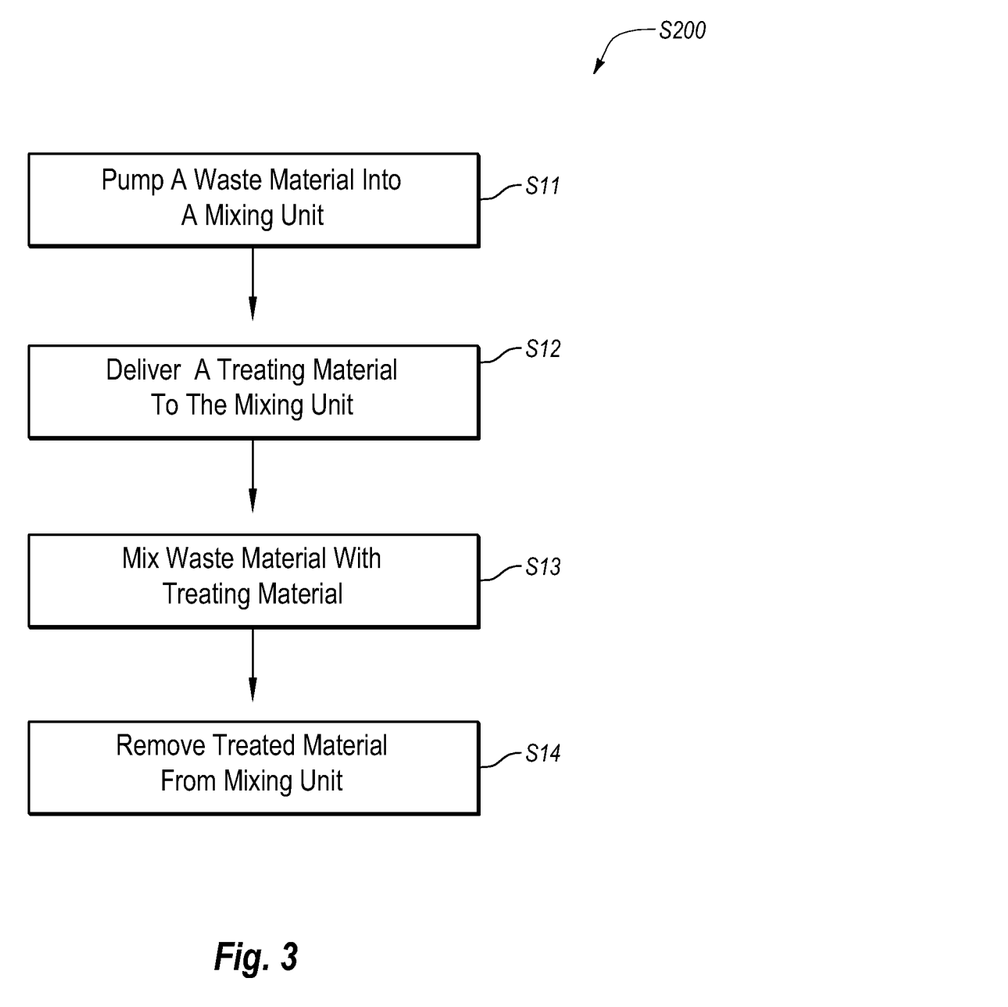
FIG. 3 illustrates a flow diagram identifying steps that may be involved in a second method for collecting and treating a waste material according to the present invention.

FIG. 3 illustrates a flow diagram identifying steps of a second method that can be implemented in a method for collecting and treating a waste material. In a first step S11, of second method S200, a waste material is delivered to a mixing unit via a pump. The pump may be selectively adjustable to deliver the waste material to the mixing unit at a desired rate. The waste material may be a liquid, slurry, or gelatinous substance.

In a second step S12, a treating material is delivered to the mixing unit. The treating material can be delivered to the mixing unit in batches or continuously. For example, a metering auger can also be used to continuously deliver the treating material to the mixing unit at a desired rate.

Figure 4:
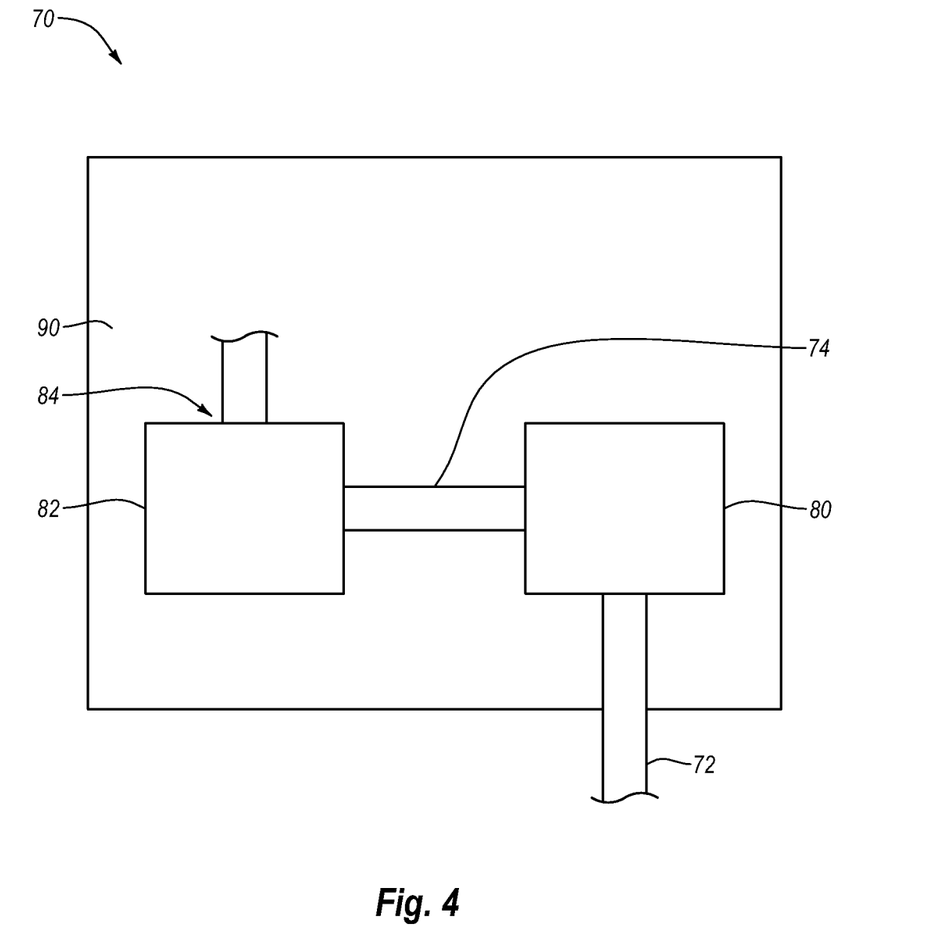
FIG. 4 illustrates a block diagram of a second exemplary apparatus according to the present invention.

In a third step S13, the waste material is mixed with the treating material. In one embodiment, a mixing auger can be used to mix the waste material with the treating material. In a final step S14, the treated material is removed from the mixing unit. The treated material can be removed in batches or continuously Each of the steps associated with second method S200 may advantageously be performed on a mobile, portable and integrated apparatus for collecting and treating a waste material (e.g., a trailer, a barge, a railroad car, etc.). Further, these steps can be performed in a closed system, which can assist in avoiding spills and leaks FIG. 4 illustrates a block diagram of an apparatus according to the present invention, which can implement the steps of second method S200. Apparatus 70 also includes a delivery mechanism, which comprises a pump 80. Pump 80 forces waste material through conduit portions 72 and 74. Conduit portion 74 delivers a waste material to a mixing unit 82. Mixing unit 82 can be powered by a motor (not shown). Mixing unit 82 mixes the waste material with a treating material. Once mixed, the treated material can exit mixing unit 82 through an outlet 84. Each of the devices associated with apparatus 70 can be advantageously positioned on a portable unit 90.

II. Exemplary Portable, Integrated Apparatus and Methods

Figure 5:
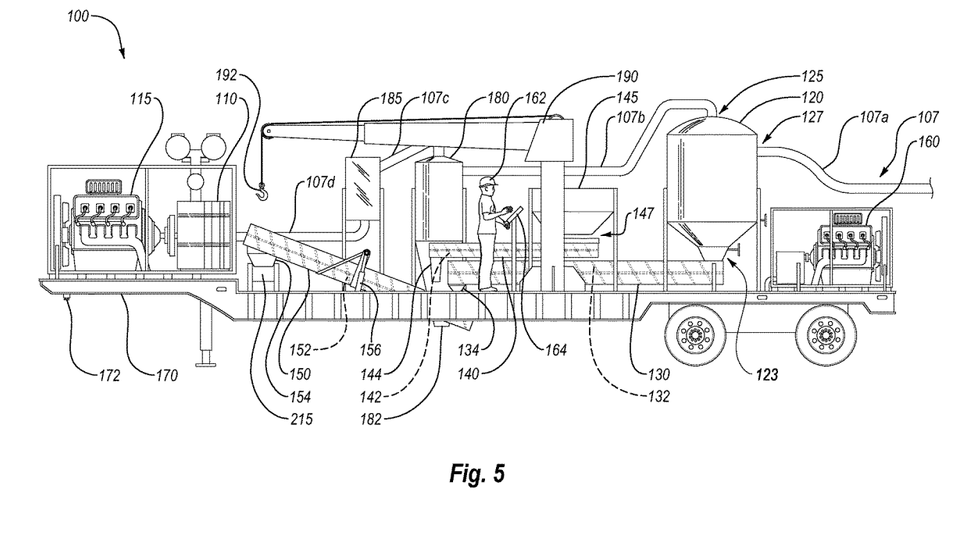
FIG. 5 illustrates an exemplary mobile waste treatment apparatus on a trailer.
Figure 6:
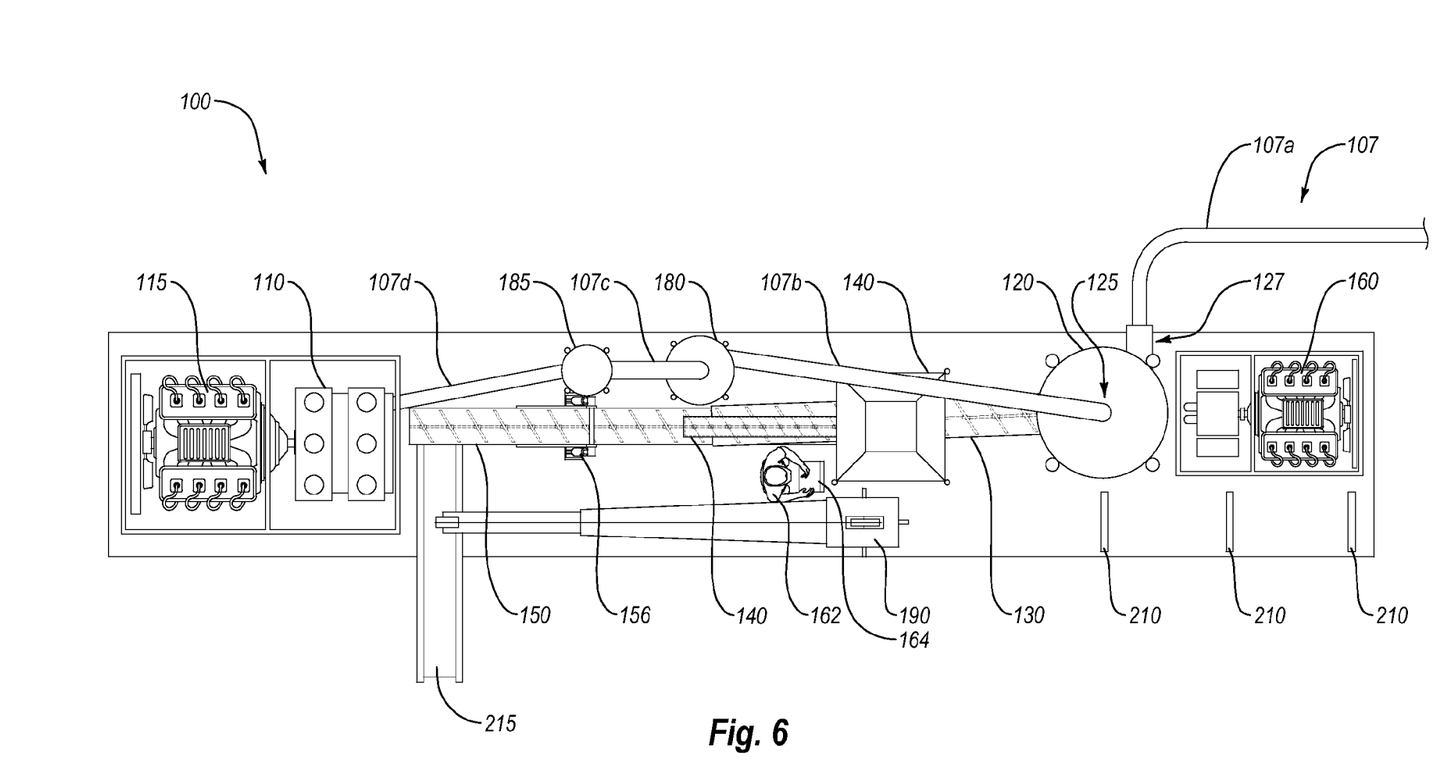
FIG. 6 illustrates a top plan view of the apparatus of FIG. 5.

FIG. 5 illustrates a side view of an exemplary embodiment of an apparatus 100 for collecting and treating a waste material according to the present invention. FIG. 6 illustrates a top plan view of the same apparatus 100. Apparatus 100 continuously collects waste material through a conduit 107. Conduit 107 is connected at one end to a blower 110. The other end of conduit 107 is located at or near a waste source or a collection of waste material. Blower 110 is powered by motor 115. Motor 115 drives blower 110, which creates a decrease in pressure within conduit 107. The decrease in pressure within conduit 107 can be sufficiently strong to suction or pull a waste material through conduit 107 and toward blower 110. For example, a waste material may be pulled through approximately two-hundred or more feet of conduit before arriving at apparatus 100. An operator at the open end of conduit 107 (not shown) can maneuver the open end of the conduit such that waste material is continuously pulled into the conduit and toward the mobile apparatus.

Conduit 107 can be made out of any material that is sufficiently strong to hold the decrease in pressure created by the blower without collapsing, and maintain integrity as a result of wear caused by waste materials. For example, conduit 107 can be manufactured from rubber, plastic, or a metal. Conduit 107 can also have a wide variety of cross-sectional shapes and sizes. For example, conduit 107 can have a circular cross-sectional shape with a diameter of between about 2 inches and about 8 inches. In another embodiment, the conduit can have a cross-sectional diameter of between about 4 inches and about 6 inches.

Conduit 107 may proceed through one or more separators that are configured to remove waste material from conduit 107 as the waste travels toward blower 110. Illustrated apparatus 100 includes three separation devices: first separator 120, second separator 180, and third separator 185. Different sections of conduit 107 that interconnect the waste source to the separation devices and the blower are identified. Specifically, conduit section 107a identifies the section of conduit 107 that is at a waste source at one end and that is secured to a first separator 120 at another end. Conduit section 107b identifies the section of conduit 107 that is secured to the top of first separator 120 at one end and to a second separator 180 at another end. Conduit section 107c identifies the section of conduit 107 that is secured to the top of second separator 180 at one end and to a third separator 185 at another end. Conduit section 107d identifies the section of conduit 107 that is secured to the bottom of third separator 185 at one end and to the blower 110 at another end.

A separator, as used herein, can be any device that separates material from air within conduit 107 as the air within conduit 107 proceeds toward blower 110. A separator, according to the present invention, can further include an integrated bag for dust collection and separation.

Separator 120 can be a cyclonic separator. Waste material and air enter separator 120 from conduit section 107a through an aperture 127 near the top of separator 120. Waste material collects within separator 120, falling toward the bottom of separator 120. Air and a residual amount of waste material are pulled from separator 120 into conduit section 107b through an aperture 125 in the top center of separator 120.

Separator 180 can also be a cyclonic separator. Air and any residual waste material enter separator 120 from conduit section 107b. Any waste material separated by separator 180 can exit separator 180 through an exit aperture 182 at the bottom of separator 180. Air and any residual waste material exit separator 180 and into conduit section 107c, which leads to separator 185. Separator 185 can be a filter. Conduit section 107d receives air and perhaps a small, acceptable amount of waste material, which is returned to blower 110. The majority of the waste material is removed by the first separator 120.

As waste material collects in a separator, it can be periodically or continuously removed. For example, the separator can be connected, either directly or indirectly, to a mixing unit. As waste material collects within a separator, it can exit the separator into the mixing unit. The rate at which waste material exits the separator into the mixing unit can be regulated. In addition to waste material, a treating material can also be introduced into the mixing unit. The rate at which treating material enters the mixing unit can also be regulated.

There are different ways to regulate the rate at which waste material from a separator enters the mixing unit. For example, electronic sensors and/or mechanical levers or controls can be used to ensure that a waste material exits the separator at a desired rate. Specifically, a metering auger can be used to control the rate at which waste material enters the mixing unit by controlling the rate at which the spiral blades within the auger rotate.

In alternative embodiments of the present invention, a separator and motor driven blower may not be necessary. Such may be the case when the waste material is pumped directly into a mixing unit. For example, in the event the waste material is in a liquid or gelatinous form, a pump may be used to deliver the material to the mixing unit. Once in the mixing unit, the waste material can be treated in the same way that waste material that is collected using a separator and motor driven blower is treated.

A mixing unit included within an embodiment of the present invention may be any device configured to mix the treating material with the waste material. Examples of mixing units suitable for use in the present invention include but are not limited to augers, batch paddle mixers, concrete mixing barrels, agitators or other blenders.

In apparatus 100, separator 120 has a bottom opening 123 through which waste material can be removed as it collects within first separator 120. A first metering auger 130 is positioned directly below opening 123 of first separator 120. The rate at which waste material proceeds through first metering auger 130 is dependent on the rate at which the blades 132 within first metering auger 130 rotate. As the blades 132 rotate faster, the rate at which waste material is extracted from first separator 120 and delivered into mixing auger 150 will also increase. First metering auger 130 may be powered by a hydraulic motor 160. In FIG. 5, an operator 162 controls the rate at which the blades 132 within the first metering auger 130 rotate by manipulating levers, buttons, or other adjustment controls, which are located on a control panel 164.

Container 145 of apparatus 100 can hold a treating material. Container 145 can be made from any material suitable for holding a treating material. For example, container 145 may have relatively rigid side walls made from plastic, metal, or another suitable material. Further, container 145 may comprise a bag that is configured to hang from a hook or other device. In such an embodiment, container 145 can be made from canvas, plastic, rubber, or another suitable material (which may be flexible).

Container 145 includes a bottom opening 147 through which the treating material can flow. A second metering auger 140 is positioned directly below opening 147 of container 145. The rate at which the treating material proceeds through second metering auger 140 is dependent on the rate at which the blades 142 within second metering auger 140 rotate. As the blades 142 rotate faster, the rate at which the treating material is extracted from container 145 and delivered into mixing auger 150 will also increase. Second metering auger 140 may also be powered by hydraulic motor 160. As with the first metering auger 130, operator 162 in FIG. 5 controls the rate at which blades 142 rotate by manipulating levers, buttons, or other adjustment controls, which are located on control panel 164.

Container 145 is not necessary for a treating material to be introduced into the mixing unit. In an alternative embodiment, a treating material can be introduced into the mixing unit through a tube, hose, or pipe. In addition, a treating material can be manually deposited into the mixing unit.

Figure 7A:
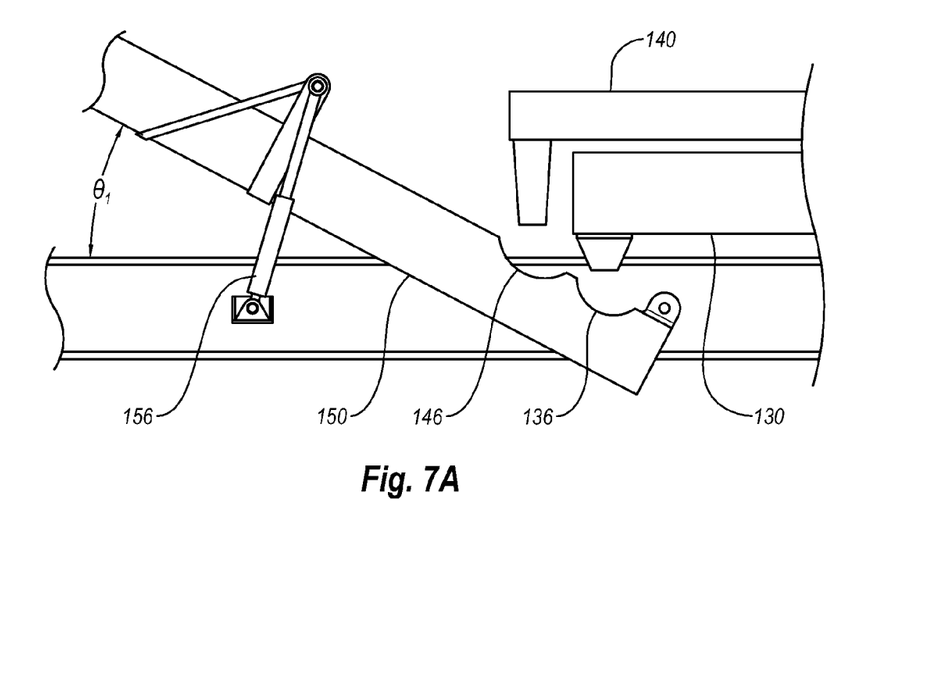
FIG. 7A illustrates a detailed view of a mixing auger of the present invention at a first angle.
Figure 7B:
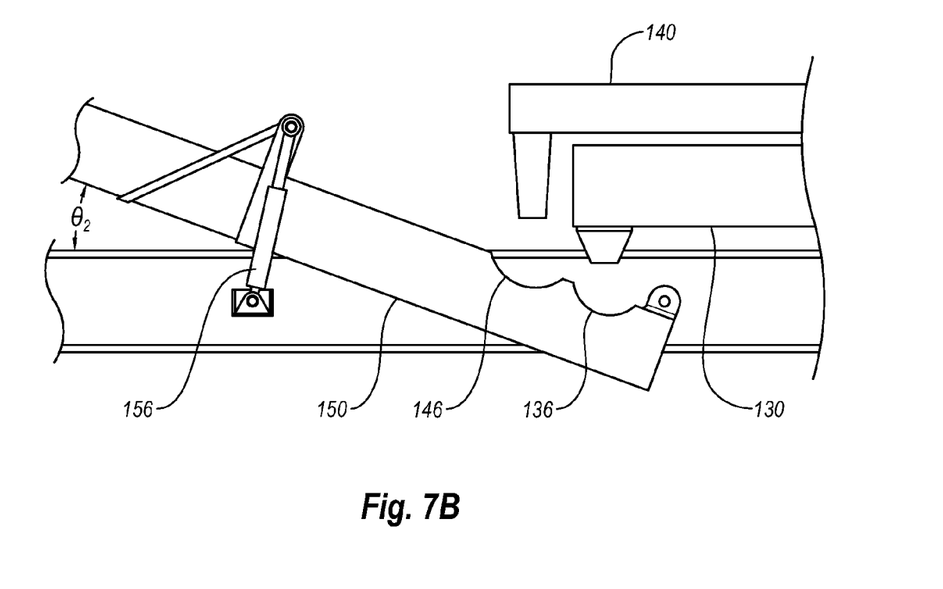
FIG. 7B illustrates a detailed view of a mixing auger of the present invention at a second angle.

In apparatus 100, first metering auger 130 deposits waste materials though spout 134 at a distal end into a mixing auger 150 through a waste material inlet 136 (see FIGS. 7A, 7B). Similarly, second metering auger 140 deposits treating material though spout 144 into mixing auger 150 through a treating material inlet 146 (see FIGS. 7A, 7B). The inlets for the waste material and treating materials may be the same, or separate and somewhat spaced apart, as illustrated in FIGS. 7A and 7B. For example, it may be beneficial for the waste material inlet 136 to be positioned before the treating material inlet 146 so that the treating material is introduced into mixing auger 150 on top of the waste material.

Further, in addition to the waste material and treating material, an accelerator can also be introduced into the mixing auger at either inlet 136, 146 or at another point within mixing auger 150. An accelerator can assist in mixing the waste material with the treating material within the mixing auger. Accelerators include, but are not limited to, sodium silicate, calcium chloride, water, acid, ferric chloride solution, or a lubricant.

Mixing auger 150 includes internal blades 152 that may be slotted or serrated so as to include holes or discontinuities therein, or have another shape for mixing. As the blades 152 within mixing auger 150 rotate, the waste material is mixed with the treating material. Mixing auger 150 may also be positioned at an inclined angle such that the waste material and the treating material travel uphill as they are mixed within mixing auger 150. As a result of the incline and slots or serrations, some of the material will tend to fall downward to the next "level" of the auger blades, aiding in providing more thorough mixing. As with the first and second metering augers 130 and 140, operator 162 can control the rate at which blades 152 within mixing auger 150 rotate by manipulating levers, buttons, or other adjustment controls, which are located on control panel 164.

The angle of inclination of mixing auger 150 can also be adjustable. Controlling the angle of inclination of mixing auger 150 may be important to ensure that the waste and treating materials are mixed together thoroughly. For example, the angle of inclination of mixing auger 150 may be a factor in the length of time a waste material is mixed with a treating material. In one embodiment, the angle of inclination of mixing auger 150 can be adjusted using one or more hydraulic actuators 156. In other embodiments, a motor or another mechanical system can be used to adjust the angle of inclination of mixing auger 150. Operator 162 can control the angle of incline of mixing auger 150 by manipulating levers, buttons, or other adjustment controls, which are located on control panel 164. In yet another embodiment, mixing auger 150 can be moved up or down manually to a greater or smaller angle of incline.

FIGS. 7A and 7B illustrate the adjustability of mixing auger 150. In FIG. 7A, hydraulic actuator 156 is extended, thereby placing mixing auger 150 at a first angle $\theta_1$ from horizontal. In FIG. 7B, hydraulic actuator 156 is more compressed, thereby placing mixing auger 150 at a second, smaller angle $\theta_2$ from horizontal. To facilitate the change in incline, hydraulic actuator 156 can be pivotally secured to mixing auger 150 at one end and pivotally secured to a support structure at another end. Mixing auger 150 can also be pivotally secured to a support structure at one end in order to allow the mixing auger 150 to pivot to a desired angle of inclination. Waste material inlet 136 and treating material inlet 146 can also be seen in FIGS. 7A and 7B.

Once the mixing unit has mixed the waste material with the treating material, the treated material can be removed from the mixing unit continuously or periodically. There are a variety of ways in which the treated material can be removed from the mixing unit. For example, treated material can be removed by hand or with a machine, such as a conveyor system. Depending on how the waste material is treated, the treated material can exhibit physical characteristics that make the material suitable for a variety of uses that are easily handled with conventional equipment. For example, treated material can be used as fill material near the waste site or elsewhere. Alternatively, the treated material can be taken to a landfill or placed in a designated area for ongoing treatment, such as biodegradation.

Apparatus 100 includes a conveyor belt 215 positioned directly below an exit aperture 154 in mixing auger 150. Conveyor belt 215 can extend away from mixing auger 150 such that as the treated material exits mixing auger 150, it is moved away from mixing auger 150. The treated material can be deposited into a portable container or directly into a truck bed, trailer, or railroad car. Conveyor belt 215 can also deposit the treated material onto other conventional equipment, into another receptacle for later removal, or onto the ground.

The apparatus for collecting and treating a waste material can also include a crane. For example, apparatus 100 in FIGS. 5 and 6 includes a crane 190 with a hook 192. Crane 190 can be used to transfer the conveyor belt 215 from a storage location where the belt is not in use to a functional location where the belt can be used. A conveyor belt may be stored, for example, on a cradle 210 (FIG. 6). Crane 190 can also be used to move or exchange out individual components of the apparatus for collecting and treating a waste material as described herein. For example, separator devices having different desired characteristics may be exchanged for any of separators 120, 180, or 185. The crane can be controlled by operator 162 by manipulating levers, buttons, or other adjustment controls, which are also located on control panel 164.

The collecting and treating apparatus as described herein can be positioned on a single portable unit so that the apparatus can be stationed at a desired site. There are many different portable units on which the apparatus of the present invention can be positioned. For example, as illustrated in FIG. 5, a portable unit can be a trailer 170. Trailer 170 in FIG. 5 has a hitch 172 that enables the trailer to be pulled behind a vehicle. A portable unit, according to the present invention, can also be a truck bed, a boat, a towable barge, a railroad car, or another transportable frame.

As the distance that a waste material must travel increases, the potential for spills also increases. Thus, decreasing the distance that a waste material travels reduces the potential of an environmentally contaminating spill. To minimize the risk of a spill, the individual components of the apparatus of the present invention can be positioned in close proximity to each other. For example, in one embodiment, the total distance that a waste material travels between the first separator and the mixing unit may be between about 8 feet and about 100 feet. In another exemplary embodiment, the total distance that a waste material travels between the first separator and the mixing unit may be between about 8 feet and about 50 feet, or even between about 10 feet and about 30 feet.

In addition, one or more of the components positioned on the portable unit may be configured to rotate about an axis in order to reduce the height of the components on the portable unit. For example, the separator may be rotatably attached to the portable unit such that the separator could be selectively positioned at a 90 degree angle. This would reduce the height of the separator thus allowing the portable unit to travel without obstruction with bridges or other structures.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for portable wet drilling waste treatment, the method comprising:

transporting a transportable frame from a first geographic location to a drilling site at a second geographic location that is distant from the first geographic location;

maneuvering an open end of a waste conduit that extends from the transportable frame around the drilling site to multiple positions of wet drilling waste that was produced at the drilling site;

vacuuming air and the wet drilling waste, using a motor-driven vacuum that is positioned on the transportable frame, from the multiple positions of the wet drilling waste into the open end of the waste conduit, through the waste conduit, and into a cyclonic separator that is positioned on the transportable frame;

separating the wet drilling waste from the air using the cyclonic separator;

using a waste auger that is positioned on the transportable frame to transport the wet drilling waste from the cyclonic separator;

using a treatment material auger that is positioned on the transportable frame to transport treatment material;

operating the waste auger and the treatment material auger at coordinated rates to transport an effective ratio of the wet drilling waste to the treatment material;

using a mixing auger that is positioned on the transportable frame to simultaneously transport the wet drilling waste and the treatment material from the waste auger and the treatment material auger, respectively; and operating the mixing auger at an effective rate to mix the treatment material with the wet drilling waste to yield in a solidified treated material.

2. The method as recited in claim 1, wherein:
the transportable frame is a trailer; and
the transporting of the trailer from the first geographic location to the drilling site at the second geographic location includes pulling the trailer using a truck on roads between the first geographic location and the second geographic location.

3. The method as recited in claim 1, wherein:
the using of the waste auger that is positioned on the transportable frame to transport the wet drilling waste from the cyclonic separator includes regulating a rate at which the wet drilling waste drops from the cyclonic separator into the waste auger.

4. The method as recited in claim 1, wherein the operating of the waste auger and the treatment material auger at coordinated rates and the operating of the mixing auger at an effective rate are accomplished by a human operator positioned on the transportable frame using a control panel that is positioned on the transportable frame.

5. The method as recited in claim 1, wherein the waste conduit is at least 200 feet in length.

6. The method as recited in claim 1, wherein the maneuvering of the open end of the waste conduit around the drilling site to the multiple positions of wet drilling waste is accomplished by a human operator manually maneuvering the open end of the waste conduit.

7. The method as recited in claim 1, wherein the operating of the mixing auger at an effective rate further includes adjusting an angle of inclination of the mixing auger with respect to level during the operating of the mixing auger such that the mixing auger mixes the treatment material with the wet drilling waste resulting in the solidified treated material.

8. The method as recited in claim 1, wherein the mixing auger includes slotted blades.

9. The method as recited in claim 1, wherein the mixing auger includes serrated blades.

10. The method as recited in claim 1, further comprising:
repositioning a conveyor belt from a first position on the transportable frame that is not underneath the mixing auger to a second position that is underneath the mixing auger.

11. The method as recited in claim 10, wherein:
the repositioning of the conveyor belt from the first position to the second position is accomplished using a crane that is positioned on the transportable frame.

12. The method as recited in claim 10, further comprising:
using the conveyor belt to transport the solidified treated material from the mixing auger.

13. The method as recited in claim 10, wherein:
the transportable frame includes a conveyor belt storage cradle; and
the first position on the transportable frame is the position of the conveyor belt storage cradle on the transportable frame.

14. The method as recited in claim 1, further comprising:
employing the motor-driven vacuum to vacuum the air and the wet drilling waste into the open end of the waste conduit, through the waste conduit, and into a second cyclonic separator that is positioned on the transportable frame;
separating the wet drilling waste from the air using the second cyclonic separator;
using the waste auger to transport the wet drilling waste from the second cyclonic separator; and
pulling the air out of the second cyclonic separator and through an air conduit that is positioned between the second cyclonic separator and the motor-driven vacuum using the motor-driven vacuum.

15. The method as recited in claim 14, further comprising:
filtering the air pulled through the air conduit using an air filter that is positioned on the transportable frame between the air conduit and the motor-driven vacuum.

16. The method as recited in claim 1, wherein the method results in the solidified treated material being suitable for use as fill material or for placement in a landfill.

17. The method as recited in claim 1, wherein:
the waste conduit includes a circular cross-sectional shape with a diameter of between about four inches and about six inches;
the treatment material includes hydroscopic or cementitious material;
the solidified treated material is solid and inert; and
a total distance that the wet drilling waste travels between the cyclonic separator and the mixing auger is between about 10 feet and about 30 feet.

18. The method as recited in claim 1, wherein the treatment material is dropped into the mixing auger on top of the wet drilling waste.

19. The method as recited in claim 1, further comprising:
rotating the cyclonic separator about an axis in order to reduce a height of the cyclonic separator on the transportable frame prior to transporting the transportable frame from the first geographic location to the second geographic location.

* * * * *